United States Patent [19]

Miyake

[11] Patent Number: 4,608,613
[45] Date of Patent: Aug. 26, 1986

[54] TRACKING APPARATUS FOR ROTARY MAGNETIC RECORDING MEDIUM

[75] Inventor: Izumi Miyake, Kaisei, Japan

[73] Assignee: Fuji Photo Film Co., Ltd., Kanagawa, Japan

[21] Appl. No.: 739,665

[22] Filed: May 31, 1985

[30] Foreign Application Priority Data

May 31, 1984 [JP] Japan .................. 59-109584

[51] Int. Cl.$^4$ .............................................. G11B 5/55
[52] U.S. Cl. ...................................... 360/78; 358/310; 360/77
[58] Field of Search ...................... 358/310; 360/77, 78

[56] References Cited

U.S. PATENT DOCUMENTS

| | | | |
|---|---|---|---|
| 4,333,116 | 6/1982 | Schoettle et al. | 360/78 |
| 4,485,418 | 11/1984 | Bremmer | 360/77 |
| 4,499,510 | 2/1985 | Harding et al. | 360/77 |
| 4,544,969 | 10/1985 | Painton | 360/78 |

OTHER PUBLICATIONS

IBM Technical Disclosure Bulletin, vol. 19, No. 4, Sep. 1976, pp. 1393-1395, Head-To-Track Synchronizing Mechanism for Magnetic Disks, Porter et al.
IBM Technical Disclosure Bulletin, vol. 22, No. 11, Apr. 1980, pp. 5103-5104, Flexible Disk File Recalibrate Procedure, Case et al.

*Primary Examiner*—George G. Stellar
*Attorney, Agent, or Firm*—Birch, Stewart, Kolasch & Birch

[57] ABSTRACT

Apparatus for a rotary magnetic recording medium includes a magnetic head for sensing signals from tracks which are formed on a rotary magnetic recording medium in such a manner that the front end of a recording operation continues positionally equal to the last end thereof; a head move device for movably supporting the magnetic head; a control unit for controlling the head move device to move the magnetic head onto a desired one of the tracks so as to perform a tracking operation, and a first detect device for detecting an envelope of signals obtained by the magnetic head. The control unit, in order to cause the head move device to move the magnetic head from a reference position specified as the reference for moving the magnetic head to a track next to the reference position, monitors a level of the envelope detected by the first detect device each time the head has traveled a first predetermined distance while the magnetic head is moved, and controls the head move device, when the level monitored exceeds a predetermined value, to move the magnetic head from the current position of the magnetic head by a second predetermined distance. The second predetermined distance is set substantially corresponding to a distance from a peak position of an envelope waveform of signals recorded on the magnetic recording medium to a position at which the predetermined value is attained.

8 Claims, 11 Drawing Figures

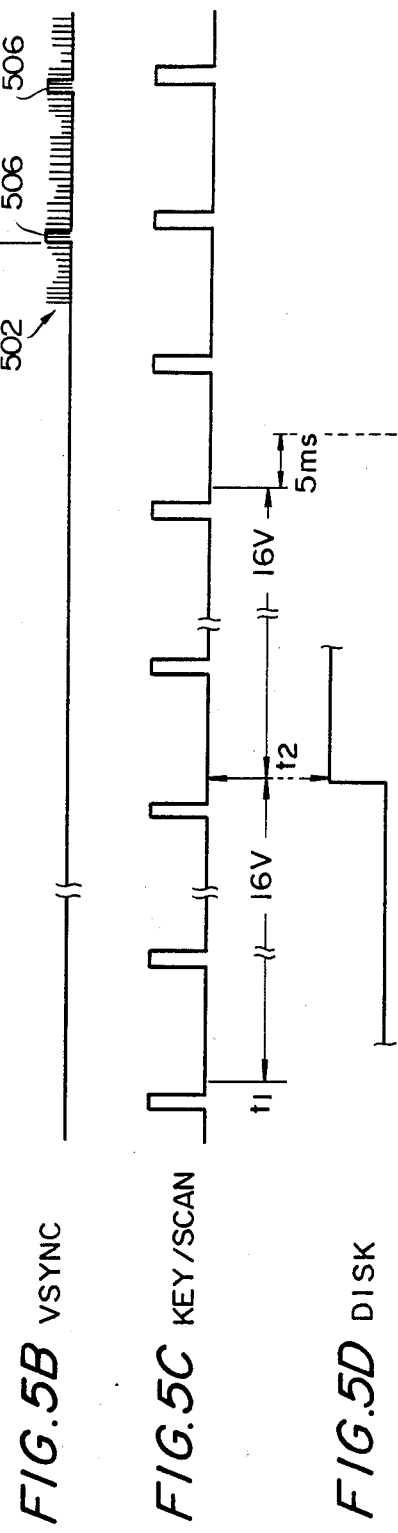
FIG. 5A PG
FIG. 5B VSYNC
FIG. 5C KEY/SCAN
FIG. 5D DISK
FIG. 5E ENVELOPE ADC OUTPUT
FIG. 5F STEPPING MOTOR

TRACKING APPARATUS FOR ROTARY MAGNETIC RECORDING MEDIUM

BACKGROUND OF THE INVENTION

1. Field of the Invention

The present invention relates to a tracking apparatus for a rotary magnetic recording medium, and in particular, to a tracking apparatus for a rotary magnetic recording medium for reproducing information recorded on a rotary magnetic recording medium, such as a magnetic disk and a magnetic drum. Specifically, the present invention relates to a tracking apparatus for a rotary magnetic recording medium for reproducing information recorded on tracks formed concentrically on a magnetic disk with tracking servo effected on accessing the tracks.

2. Description of the Prior Art

There has been recently developed an electronic still camera system including an image pickup device, such as a solid-state image pickup device or tube, and a recorder utilizing as a recording medium a low-price magnetic disk having a relatively larger recording capacity, in which an electronic still picture of an object is recorded on a rotating disk, and the recorded picture is reproduced by use of a separate television system, a printer, or the like.

However, recording media utilized in such magnetic recording, especially magnetic disks are likely to cause a tracking failure due to the anisotropy, eccentricity, thermal expansion, and the like. Consequently, a track adjacent to the track to be scanned for the reproduction is erroneously scanned, which results in crosstalk of signals reproduced.

In order to overcome this difficulty, there has been adopted a method in which the tracking servo is applied when recording information so as to record tracking signals, and the tracking servo is effected by use of the recorded tracking signals when reproducing the information. However, a tracking servo mechanism requiring a precise control cannot be practically incorporated in a light-weight, compact recording apparatus such as a camera.

There has been a method utilizing a guard band system or an FM azimuth system as a recording scheme so as to compensate for above-stated operations, that is, the playback head is prevented from scanning the adjacent wrong track due to a slight tracking failure during the playback, and the signals, even though scanned on the adjacent track, could be blocked.

On the other hand, there has been utilized a method called an envelope peak detecting autotracking system. In accordance with this system, the recording head is moved with a predetermined pitch by use of a stepping motor without tracking servo when recording information, whereas an envelope of the output signals reproduced from a track is detected and the optimum track position is identified based on the peak position of the envelope, thereby accomplishing the tracking servo on the operation for reproducing the recording signals.

In an electronic still camera system, a rotary magnetic recording medium that is used includes, for example, a magnetic disk of which the diameter is about 50 mm, and the track pitch, track width, and guard band width are selected to be about 100 $\mu$m, 50 $\mu$m to 60 $\mu$m, and 40 $\mu$m to 50 $\mu$m, respectively, in order to record information on 50 tracks of the disk surface. When installed in a recording or playback apparatus, a magnetic disk is rotated at a constant rotating rate of, for example, 3,600 revolutions per minute (rpm) so as to record or reproduce image signals at a field or frame rate.

Such a thin, compact magnetic disk having a relatively smaller diameter is usually housed in a mold package made of materials such as plastic. That is, the disk package is installed in a disk mounting unit of a recording or playback apparatus, and is rotated in the same state for recording or reproducing information.

In order to select an appropriate track in a playback operation, it is required to correctly identify tracks, or the track number thereof. To this end, the magnetic head is required to be returned to the reference or home position at a proper time, for example, when the apparatus gets powered. The reference position is ordinarily set to the outermost track of the magnetic disk or a location further outside the outer-most track thereof.

The home position is sensed by a mechanical position sensor mechanism such as a limit switch. Although such a mechanical position sensor, for example, a leaf switch, has a relatively wide allowance for the position sense precision, the adoption thereof advantageously simplifies the construction of the apparatus. With respect to rough precision in sensing a position, however, a mechanical sensor is not suitable for a thin magnetic disk having a small diameter in order to establish a higher precision for sensing a position which is required to implement correct tracking operation.

SUMMARY OF THE INVENTION

It is therefore an object of the present invention to provide a tracking apparatus for a rotary magnetic recording medium in a simplified configuration which advantageously includes a mechanical position sense mechanism having a relatively lower precision for sensing the reference position to accomplish a rapid track selection.

According to the present invention, there is provided a tracking apparatus for a rotary magnetic recording medium comprising: magnetic head means for sensing signals from a plurality of tracks which are formed on a rotary magnetic recording medium in such a manner that the front end of recording operation continues positionally to the last end thereof; head move means for movably supporting the magnetic head; control means for controlling the head move means to move said magnetic head means onto a desired one of the plurality of tracks so as to perform a tracking operation; and first detect means for detecting an envelope of signals sensed by the magnetic head means; the control means, causes said head move means to move the magnetic head means from a reference position specified as the reference for moving the magnetic head means to a track next to the reference position by monitoring a level of the envelope detected by the first detect means each time said head means has traveled a first predetermined distance, controlling the head move means and when the level monitored exceeds a predetermined value moves to move the magnetic head means from the current position of the magnetic head means by a second predetermined distance, the second predetermined distance being set substantially corresponding to a distance from a peak position of an envelope waveform of signals recorded on the magnetic recording medium to a position at which the predetermined value is attained.

In this context, the words "a plurality of tracks formed on a rotary magnetic recording medium in such a manner that the front end of a recording operation positionally continues to the last end thereof" include the track configuration of, for example, tracks formed concentrically about the rotation axis of a magnetic disk or those formed in parallel to each other circumferentially on a magnetic drum, that is, tracks which are formed by a magnetic head to record information without changing the relative position thereof to a rotating magnetic recording medium.

BRIEF DESCRIPTION OF THE DRAWINGS

The objects and features of the present invention will become more apparent from the consideration of the following detailed description taken in conjunction with the accompanying drawings in which:

FIGS. 5A–5F show the operational timings of the control unit of the embodiment shown in FIG. 1.

DESCRIPTION OF THE PREFERRED EMBODIMENT

An embodiment of the present invention will be described by referring to the accompanying drawings.

Figure 1:
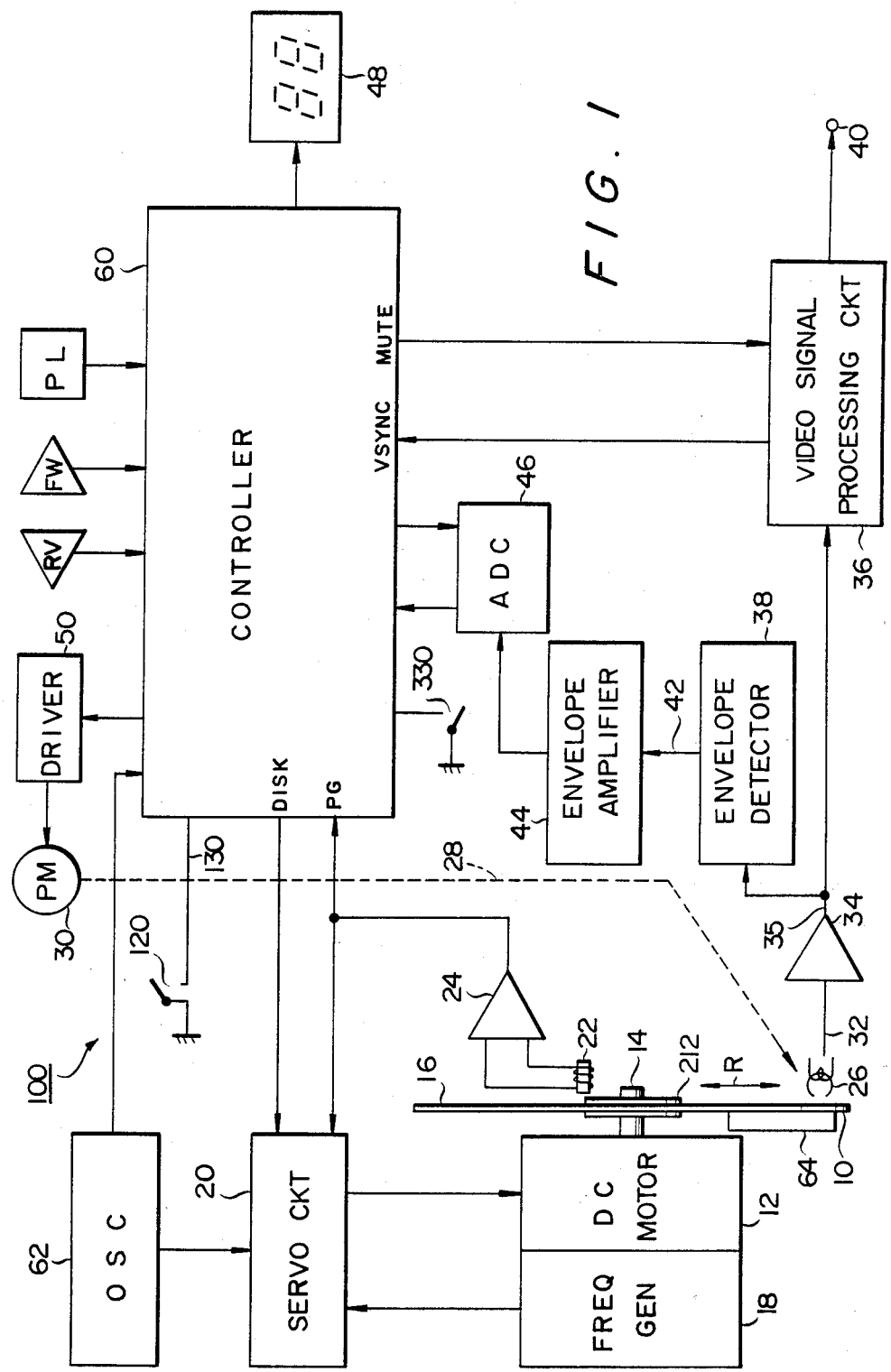
FIG. 1 is a schematic circuit block diagram illustrating an embodiment of tracking apparatus for a rotary magnetic recording medium in accordance with the present invention.

In an apparatus of FIG. 1 embodying the present invention, a rotary recording medium 10, such as a magnetic disk, is detachably mounted on a spindle 14 driven by a direct current (DC) or spindle motor 12. The magnetic disk 10 of this embodiment comprises a sheet including a magnetic recording material and having a diameter of about 50 mm. Disk 10 has a recording surface 16, on which, for example, 50 concentric recording tracks may be formed with a pitch of about 100 μm. Signals recorded on tracks may, in this embodiment, include video signals, which may be color video signals including frequency-modulated luminance, chrominance and synchronizing signals. The video signals may be recorded on a track in the form of a field of video signals forming a field of image in a raster scanning fashion.

The DC motor 12 comprises a frequency generator 18 for generating an alternate current (AC) frequency signal and is powered by a servo circuit 20 so as to be controlled to drive the disk 10 to rotate at a fixed rotation rate, for example, 3,600 rpm. The servo circuit 20 is connected to a controller 60 controlling the overall operation of this apparatus and drives or stops the rotation of the disk 10 in response to a signal, DISK.

A phase generator 22 disposed at a predetermined location in the vicinity of the recording surface 16 of the disk 10 is connected via an amplifier 24 to the servo circuit 20 and the controller 60. A timing mark or indicia provided in a predetermined position on the recording surface 16 can be thus sensed to generate a timing pulse, PG.

A magnetic transducer, that is, a magnetic head 26 disposed over the recording surface 16 is carried by a support mechanism 28. As conceptionally illustrated by a dotted line 28, the support mechanism is driven by a stepping motor (PM) 30 and radially moves the head 26 in both directions over the recording surface, thereby enabling an arbitrary track on the recording surface to be selected.

Although the magnetic head 26 may have a magnetic recording function, this embodiment shows a magnetic head which has a playback function for sensing video signals recorded on a track of the recording surface 16 and for converting the video signals into the associated electric signals. As described before, since the disk 10 of this embodiment rotates at a constant rate of 3,600 rpm, a track of video signals, that is, a field of video signals that have undergone frequency modulation are reproduced by the magnetic head for each disk rotation or 1/60 second. When subjected to demodulation, these signals become compatible with the standard color television format such as the NTSC format.

The magnetic head 26 has a sensor output 32 connected via a preamplifier 34 to a video signal processing circuit 36 and an envelope detector circuit 38. The video signal processing circuit 36 processes video signals sensed by the magnetic head 26, for example, in order to deliver the resultant signals in the form of composite color video signals in the NTSC format to an output of the apparatus. This circuit demodulates the video signals and extracts the vertical sync signal, VSYNC, from the demodulated composite color video signals in the NTSC format to supply the obtained VSYNC to the controller 60. It receives a signal, MUTE, from the controller 60 and fills the effective horizontal scanning period of the video signal with blank signals so as to perform the muting operation. The function for converting the signal format into the standard format as described above is not an indispensable function of this apparatus, that is, the processing circuit 36 may only have a synchronous extract function for synchronously extracting desired signals from the video signals sensed by the magnetic head 26, and an output function for delivering the obtained signals to the terminal 40 under control of the controller 60.

The envelope detect circuit 38 detects the envelope of the FM video signals recorded on a track of the recording surface to supply an output 42 with a voltage associated with the detected envelope. This circuit is connected via an envelope amplifier 44 to an analog-to-digital converter (ADC) 46. The ADC 46 having 256 quantization levels in this embodiment converts signals into 8-bit data representative of the levels in accordance with instructions from the controller 60 to feed the obtained data to the controller 60.

As will be described later, the controller 60 supervises the control of the overall apparatus according to the operation conducted by the operator, and is advantageously configured by use of a microprocessor system, for example.

In this embodiment, there are provided a playback (PL) key for initiating and terminating the operation of the apparatus, a forward (FW) key for moving the magnetic head 26 in the forward direction with respect to the track numbers (for example, from the outer track to the inner track), and a reverse (RV) key for moving the magnetic head 26 in the reverse direction, those keys being connected to the controller 60. A track number entered by use of the FW or RV key is displayed on a display device 48, such as a photodiode indicator or a CRT display, connected to the controller 60. The display device 40 is also used to display the states of the apparatus, for example, a state that a new magnetic disk on which information has not been recorded has been installed in the apparatus. Obviously, the display device may be provided with an audible alarm device to supply an audible indication, for example, an alarm.

The stepping motor 30 is a 4-phase drive pulsating motor in this embodiment and it is rotated about 15° in response to a drive pulse supplied thereto. Consequently, the rotor thereof makes a complete revolution with 24 drive pulses. The head support mechanism 28 is so configured as to move the magnetic head 26 by about 42 μm in the direction of arrow R when a pulse is supplied to the stepping motor 30. The exciting duration of a pulse is about two to three ms, and hence the magnetic head 26 is moved by approximately 100 μm with 24 pulses.

The drive pulse is supplied from a drive circuit 50 comprising a current amplifier. The drive circuit 50 generates a pulse for driving an excitation coil winding of the stepping motor 30 in accordance with an excitation pattern specified by the controller 60.

The controller 60 and the servo circuit 20 are responsive to reference clock signals generated by a reference oscillation generator (OSC) 62. In this embodiment, the servo circuit 20 is supplied with a reference signal having a frequency of 60 Hz, which is equal to the field frequency of the raster scan video signal to be recorded on the magnetic disk 10, while the controller 60 is supplied with a clock signal having a higher frequency of 3.58 MHz.

Figure 2:
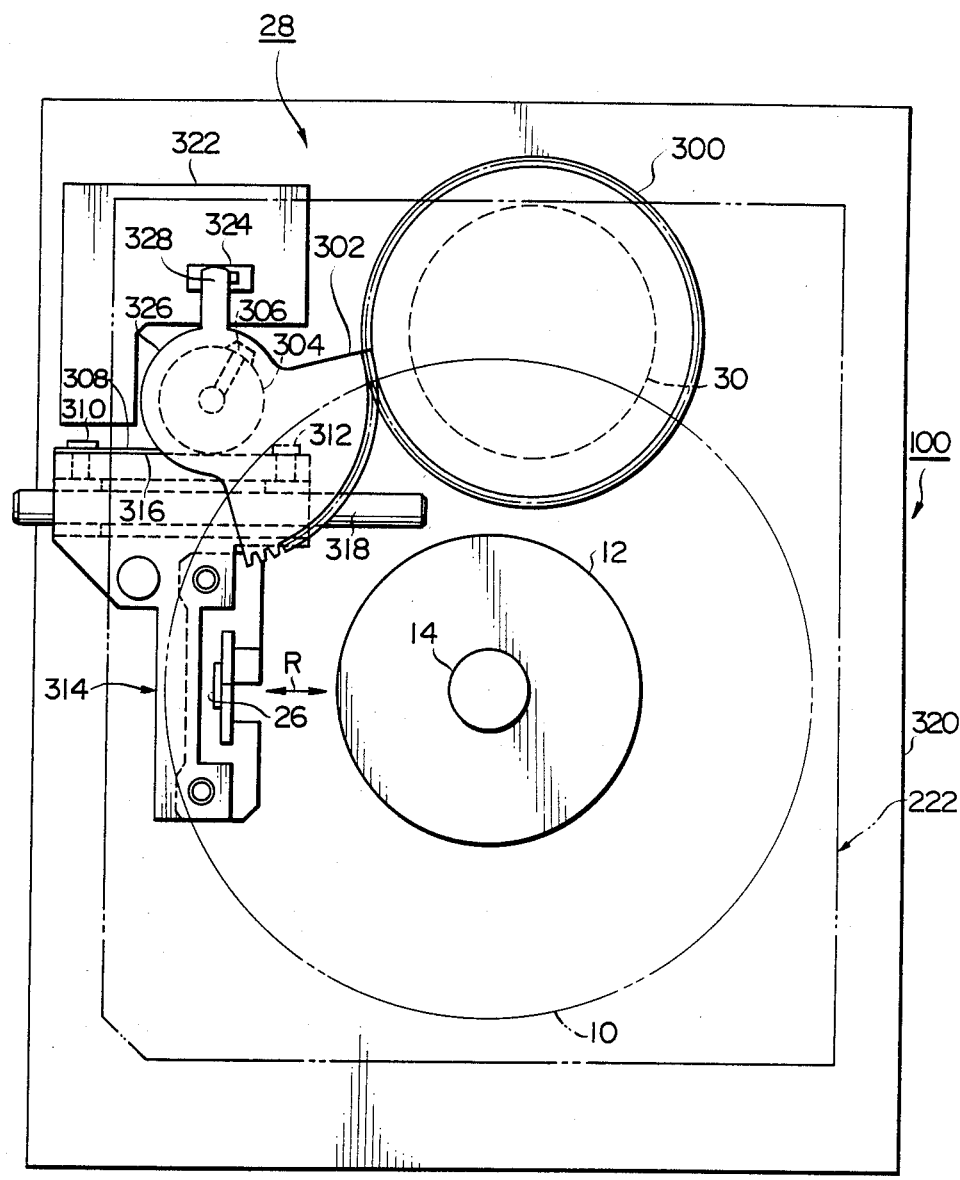
FIG. 2 is a plan view depicting the mechanical configuration of the embodiment of the apparatus.

As shown in FIG. 2, the head move mechanism 28 of the apparatus 100 comprises a deceleration mechanism 300 having an output stage engaged with a sector gear 302. A pulley 304 which rotates together with the sector gear 302 is mounted thereon. A wire 308 is fixed to the pulley 304 at a point by use of retaining means 306. The ends of the wire 308 are fixed on a side surface 316 of a head carriage 314 by use of retaining means 310 and 312. The magnetic head 26 is supported by the head carriage 314, so that this configuration allows the head carriage 314 to slide on a guide rod 318 in the direction of arrow R according to the driving action of the motor 30.

When the magnetic disk 10 housed in a package 222 is installed in the apparatus 100, a core 212 of the disk 10 is linked to the spindle 14 and the magnetic head 26 is moved in the radial direction R over the disk 10. The outer-most position of the head travel as shown in FIG. 2 is sensed by a limit switch 324 disposed on a member 322 fixed to a cabinet 320 of this apparatus 100. That is, a protruding arm 328 is disposed on in a location of a circular portion 326 of the sector gear 302, and when the magnetic head 26 is moved approximately to the outer-most position, that is, the home position (HP, FIG. 4) of the head 26, the arm 328 is brought into contact with a movable member of the switch 324 to close a contact point 330, FIG. 1, by pushing the movable member.

Figure 3:
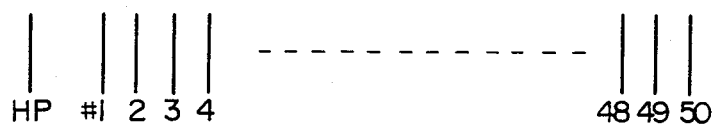
FIG. 3 is an explanatory diagram showing the track layout on a magnetic disk applicable to the apparatus.

In this embodiment, the tracks of the magnetic disk 10 are numbered in the ascending order in the direction from the outer-most track to the inner-most track as depicted in FIG. 3, and the home position (HP) of the magnetic head 26 is set to a position outside the outer-most track, i.e., truck 1. Track selection or tracking control is carried out by counting the number of tracks, that is, the number of the envelope peaks during the head travel in reference to the reference position on the home position (HP).

The tracking operation in accordance with the envelope peak detecting autotracking control is performed as follows. First of all, assume that the magnetic head 26 has been positioned on a track. When the FW or RV key is actuated, the controller 60 causes the drive circuit 50 to initiate the stepping motor 30 so as to move the magnetic head 26 in the forward or reverse direction, when appropriate.

In this embodiment, the magnetic head 26 is first moved in the forward or reverse direction by a distance, about 96 μm associated with 23 pulses, which is slightly less than the track pitch, 100 μm, for example. The signals read by the magnetic head 26 during this operation are detected by the envelope detect circuit 38 to be converted into the associated digital data by the ADC 46, which delivers the resultant signals to the controller 60. Then, the controller 60 further moves the magnetic head by a pulse and detects the level of the envelope of signals obtained by the magnetic head 26, then compares the envelope level with the previous envelope level.

The controller 60 detects and compares the envelope levels while moving the magnetic head 26 as described above, thereby determining the peak position of the envelope. When the envelope peak is determined, head 26 is properly positioned on the appropriate track. In this manner, the controller 60 carries out the tracking operation in accordance with the envelope peak detecting autotracking control.

In order to locate the magnetic head 26 at the nominal position according to the envelope peak detecting autotracking control, it is desirable to return the magnetic head 26 to the home position (HP) to initiate the tracking operation. For this purpose, the controller 60 returns the magnetic head 26 to the home position (HP) in the fashion described as follows.

When this apparatus becomes powered, or when the inner bucket in which a magnetic disk package 200 is to be installed is opened to break a contact point 120 responsive to the action of the inner bucket, the controller 60 causes the drive circuit 50 to start the stepping motor 30 so as to move the magnetic head 26 in the reverse direction, that is, radially toward the outer-most track, thereby returning the magnetic head 26 to the home position (HP).

During the operation described above, the controller 60 scans the keys at an interval of about 1 V period (field period) in order to monitor the state of a switch 330, where "V" represents a period of vertical scanning. If it is sensed by the monitoring operation that the switch 330 has been closed, that is, if the arm 328 of the sector gear 302 has been brought into contact with the switch 324 to enable the switch 32, then the controller 60 instructs the drive circuit 50 to stop driving the motor 30. Then, the magnetic head 26 is assumed to have been restated to the home position (HP). The controller clears to zero the counter for counting the number of tracks, that is, the head travel distance. Because of the error in determining the mechanical operation position of the limit switch 324, the head 26 may stop at the home position with a considerable allowance.

As illustrated in the timing chart of FIG. 5, the key scanning operation is carried out at an interval of about 1 V period in this embodiment, FIG. 5C. The signal is generated by the controller 60 based on the clock signal supplied from the reference oscillation generator 62, and is utilized as the timing signal which is the reference for the operation of the controller 60 until the magnetic disk 10 is set to the constant or stationary rotation.

At time t1, FIG. 5, for example, if the controller 60 determines that a contact point 120 has been closed and identifies that the magnetic disk 10 has been installed in an appropriate position, it enables a control line, DISK, after 16 V period is elapsed (at time t1), and causes the servo circuit 20 to rotate the spindle motor 12 at a constant revolution rate, FIG. 5D. When the motor rotation reaches the predetermined revolution rate, the signal PG is extracted from the phase generator 22 in synchronism with the rotation. Once the signal PG is set to the stationary state, the controller 60 operates thereafter with reference to the PG signal in place of the key scan signal.

Figure 4:
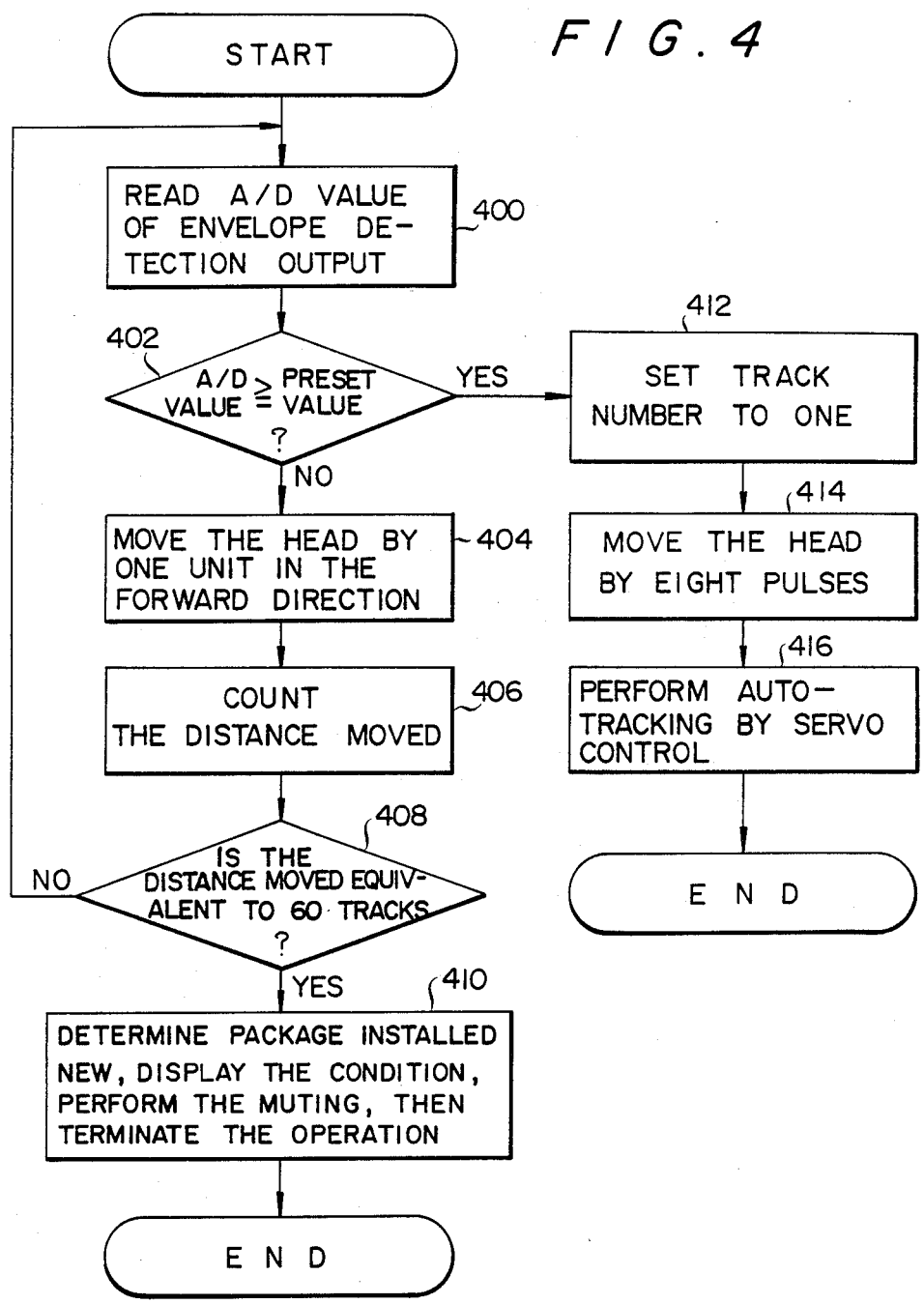
FIG. 4 is an operation flowchart illustrating exemplified operations of the control unit in the embodiment of FIG. 1.

As described above, if the FW key is actuated while the contact point 330 is closed with the magnetic head 26 returned to the home position (HP), the controller 60 operates according to the flowchart shown in FIG. 4. When a predetermined period of time is elapsed after the signal, DISK, is enabled, that is, at time t3, the controller 60 commences reading the value (A/D converted value) of the envelope obtained from the ADC, step 400 in FIG. 4.

Figure 6:
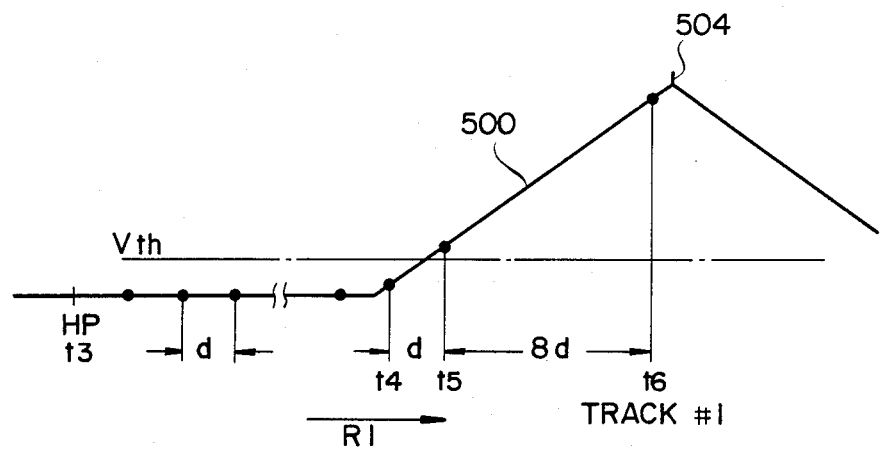
FIG. 6 is an explanatory diagram useful for understanding operations of the apparatus for sensing the first track.

When the controller 60 senses actuation of the FW key during an input scanning operation, it moves the magnetic head 26 in the forward direction R1 by one unit of distance, d FIG. 6. The distance, d, may be set to be equivalent to a pulse of the stepping motor 30 (for example, about two to three milliseconds) or several pulses thereof. During the operation, the controller 60 counts one unit of distance, d, traveled by the magnetic head 26, step 406. The counting operation is performed to determine whether or not the magnetic head 26 has been moved by a distance equivalent to the track pitch.

In this manner, control passes through a loop from step 400 to step 408 so as to monitor the level of the envelope at each position to which the magnetic head 26 is moved by one unit of distance, d, in the forward direction.

As schematically shown in FIG. 6, as the magnetic head 26 is moved from the home position (HP) thereof toward track #1, the signals associated with the envelope conceptually depicted by a real line 500 are recorded on the magnetic disk 10. Each time the controller 60 moves the magnetic head 26 by one unit, d, in the forward direction R1, it detects the envelope of the signals obtained from the head 26 at a position indicated by a dot in the figure. During a short period of time after the head 26 is moved from the home position (HP), the level of the envelope sampled as described above does not exceed the predetermined value, namely, a threshold value Vth, and hence control passes through the processing of the loop shown in FIG. 4.

The level does not exceed the predetermined value Vth at time t4; however, if it exceeds the value at time t5, the controller 60 assumes that the magnetic head 26 is in the vicinity of track #1. Control therefore branches from step 402 to step 412 so as to set the counter for counting the track number to one. Then, video signals recorded on track #1 are allowed to be supplied through the magnetic head 26 to the video signal processing circuit 36 as indicated by reference numeral 502 in FIG. 5B.

The controller 60 then instructs the drive circuit 50 to move the magnetic head 26 by a predetermined number of pulses, for example, eight pulses, step 414. If it is detected that the envelope level exceeds the predetermined value Vth at time t5, the magnetic head 26 is assumed to be in the vicinity of the first track during the forward movement of the head 26. Consequently, it is provable that an envelope peak 504 may exist in the neighborhood of a position apart from above-mentioned position by a predetermined distance in the forward direction.

The predetermined number of pulses is thus set to be equivalent to the distance from the position at which the value Vth is exceeded on an ordinary envelope waveform to a position in the vicinity of the envelope peak. Contrarily, the number of pulses, that is, the distance from a peak of the envelope 500 to a point in the vicinity of the end of thereof may be first established, and then the threshold value Vth can be specified accordingly. The threshold value Vth is set to a level for which the envelope can be significantly detected with consideration to variations and fluctuations in noise and parameters of the circuitry.

In this embodiment, one unit of head travel distance, d, is set to be equivalent to a pulse, while the predetermined distance described above is set to be equivalent to eight pulses, that is, 8d. The threshold value Vth is selected to be slightly less than the envelope level obtained at a position displaced by the distance 8d from the peak 504 on the ordinary envelope waveform 500.

In order to advantageously control the motor 30, the distance to move the magnetic head 26 after the envelope level is significantly detected is set to an integer multiple of the unit of head travel conducted before the envelope level is detected, that is, an integer multiple of distance equivalent to a pulse. For the envelope peak detecting autotracking control, step 416, to be executed later, the distance is advantageously set to be slightly less than the distance from the position of the peak 504 of the envelope waveform 500 to the position at which the envelope level exceeding the threshold value Vth is detected.

The video signals read from the track and reproduced by the magnetic head 26 contain the vertical sync signal, VSYNC, 508 beginning from a time point in the neighborhood of time t5 as shown in FIG. 5B. In this embodiment, the VSYNC 508 is set to be apart from the phase signal, FIG. 5, generated by the phase generator 22 by 7H.

As described hereabove, the controller 60 moves the magnetic head 26 while monitoring the envelope level. During the head travel, the controller 60 counts the distance traveled by the magnetic head 26 in terms of the track pitch or the head travel unit, step 406. If the envelope level exceeding the threshold value Vth is not detected even when the magnetic head 26 is moved over the magnetic disk 10 beyond the track range in which information can be recorded; in this embodiment, for example, if such an envelope level is not found even when the magnetic head 26 is moved by 60 tracks with the track range set to be 50 tracks, then the magnetic disk 10 is determined to be a new or virgin disk on which information has not been recorded, step 408. In this case, the controller 60 displays the condition on the display equipment 48 and enables the signal, MUTE, so as to mute the video signals, then terminates the operation of the system, step 410.

In this embodiment as described above, if a significant envelope level is detected when moving the magnetic head 26 from the home position (HP), thereof to the first track, the magnetic head 26 is moved from the position by the predetermined distance, for example, 8*d*, in order to rapidly reach a position in the vicinity of the peak 504 of the envelope 500 associated with the track #1. Then, the envelope peak detecting autotracking control is applied to the tracking operation with the magnetic head 26 located at a position in the vicinity of the objective track position.

According to the advantageous features of the present invention described above, the magnetic head 26 can be rapidly placed on the first track with a high reliability even in the case where a mechanical position sense mechanism having a relatively low precision for detecting a position is utilized to sense the home position of the magnetic head 26. In other words, when sensing the first track, the magnetic head 26 cannot be stopped at a position at which the envelope is not found or at a "valley" or "trough" of the envelope waveform.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A tracking apparatus for a rotary magnetic recording medium comprising:

magnetic head means for sensing signals from a plurality of tracks which are formed on the rotary magnetic recording medium in such a manner that the front end of recording operation continues positionally to the last end thereof;

head moving means for movably supporting said magnetic head means;

control means for controlling said head moving means to move said magnetic head means onto a desired one of said plurality of tracks so as to perform a tracking operation; and first detector means for detecting an envelope of signals sensed by said magnetic head means;

said control means, in order to cause said head moving means to move said magnetic head means from a reference position to a track next to the reference position monitoring a level of said envelope detected by said first detector means each time said head means has traveled a first predetermined distance;

said control means further controls said head moving means, so that when the envelope level monitored exceeds a predetermined value, said control means moves said magnetic head means from the position at which said predetermined value is detected by a second predetermined distance;

wherein said second predetermined distance is set to substantially correspond to a distance between a peak position of an envelope waveform of signals recorded on the magnetic recording medium and a position at which said predetermined value is detected.

2. The apparatus according to claim 1 further comprising second detector means disposed in the neighborhood of said reference position for generating a reference position detect signal indicative of detection of the reference position when said magnetic head means is moved to the neighborhood of said reference position; said control means, in order to return said magnetic head means to said reference position, stopping the movement of said magnetic head means in response to the reference position detect signal generated.

3. The apparatus according to claim 1 wherein said second predetermined distance is an integer multiple of said first predetermined distance.

4. The apparatus according to claim 1 wherein said second predetermined distance is set to be slightly less than the distance between the peak position of the envelope waveform of signals recorded on the magnetic recording medium and the position at which said predetermined value is detected.

5. The apparatus according to claim 1 wherein the rotary magnetic recording medium is a magnetic recording disk having a track on which is recorded a field of video signals including luminance, croma and synchronous signals modulated in frequency, said first detect means detecting envelopes of the modulated video signals sensed by said head means.

6. Apparatus according to claim 3 wherein said head moving means includes:

a stepping motor for moving said head means by a unit distance in response to a pulse supplied thereto; and pulse source means responsive to said control means for supplying said stepping motor with pulses in accordance with a predetermined pattern; said predetermined pattern being produced by said control means; said first predetermined distance being substantially equal to the unit distance.

7. The apparatus according to claim 6 wherein the rotary magnetic recording medium is a magnetic recording disk having a track on which is recorded a field of video signals including luminance, croma and synchronous signals with pitch of approximately 100 $\mu$m to an adjacent track, said unit distance being substantially equal to 4 $\mu$m, said second predetermined distance being eight times as long as the first predetermined distance.

8. The apparatus according to claim 1 wherein the rotary magnetic recording medium is a magnetic recording disk having a track on which is recorded a field of video signals including luminance, croma and synchronous signals modulated in frequency, said apparatus further comprising reproducing means for demodulating the modulated video signals sensed by said head means to develop the video signals for display.

* * * * *